Feb. 19, 1935.  E. S. COOK  1,991,881
FLUID PRESSURE BRAKE
Original Filed Aug. 20, 1932
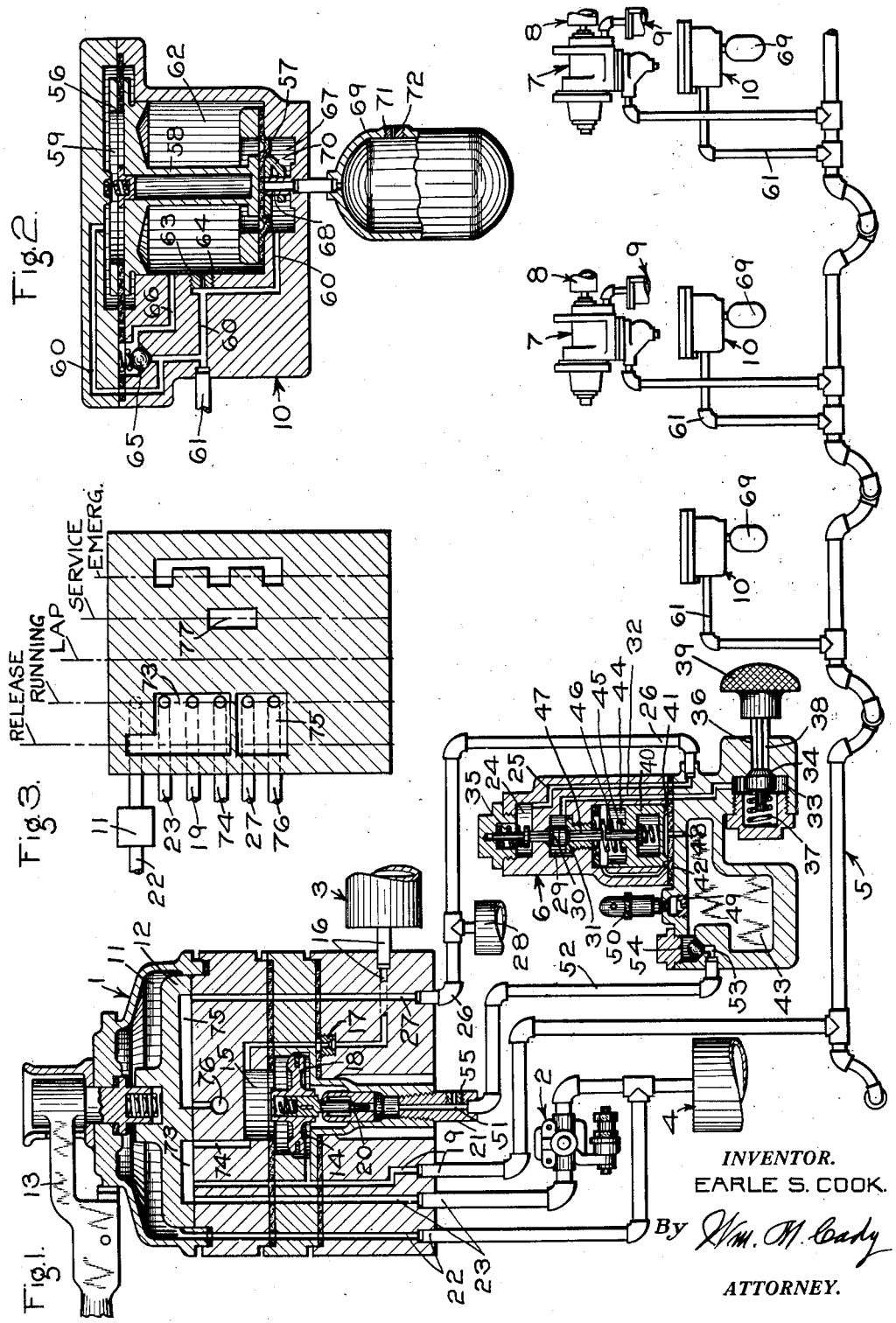
INVENTOR.
EARLE S. COOK.
By Wm. M. Cady
ATTORNEY.

Patented Feb. 19, 1935

1,991,881

UNITED STATES PATENT OFFICE 1,991,881

FLUID PRESSURE BRAKE

Earle S. Cook, Wilkinsburg, Pa., assignor to The Westinghouse Air Brake Company, Wilmerding, Pa., a corporation of Pennsylvania Application August 20, 1932, Serial No. 629,594
Renewed May 23, 1934

16 Claims. (Cl. 303—55)

This invention relates to automatic fluid pressure brake systems in which the brakes are applied by effecting a reduction in brake pipe pressure and more particularly to that type of system which is disclosed in the following pending applications for United States Letters Patent, Serial No. 563,278, filed September 17, 1931, and Serial No. 624,247, filed July 23, 1932.

In the handling of long trains it is highly desirable to apply the brakes on cars at the rear end of the train as nearly as possible in synchronism with the application of the brakes on the cars at the head end of the train, so as to prevent slack in the train from running in at such a rate as to cause excessive and damaging shocks.

As pointed out in the first above identified application, in order to accomplish this result, a fluid pressure brake system is provided which embodies means located on the locomotive for automatically effecting successive reductions in brake pipe pressure so long as the brake valve device is maintained in service position and which embodies sensitive and yet stable means located on cars of the train which are responsive to each reduction in brake pipe pressure effected through the operation of the means on the locomotive, for effecting corresponding successive local reductions in brake pipe pressure.

In the second mentioned application, in order to accomplish this result, a fluid pressure brake system is provided which embodies means located on the locomotive operative manually for effecting each successive reduction in brake pipe pressure and which embodies, on the cars of the train, the same sensitive and stable means for effecting local reductions in brake pipe pressure as is embodied in the system disclosed in the first mentioned application.

Instead of having these successive reductions in brake pipe pressure automatically effected as disclosed in the first mentioned application or manually controlled as disclosed in the second mentioned application, it may be desired to have the automatic feature as well as the manual feature embodied in a single locomotive apparatus, and the principal object of my invention is to provide means on the locomotive whereby the operator may, at will, regulate the interval of time elapsing between successive reductions in brake pipe pressure or may cause a series of successive reductions in brake pipe pressure to be automatically effected at regular intervals.

Other objects and advantages will appear in the following more detailed description of the invention.

In the accompanying drawing; Fig. 1 is a diagrammatic view, with parts of the locomotive brake apparatus in section, of a fluid pressure brake system for a train and embodying my invention; Fig. 2 is a sectional view of the quick service brake pipe venting valve device employed on cars of the train; and Fig. 3 is a diagram showing the connections which are made in the different operating positions of the brake valve device.

The fluid pressure brake system may comprise the usual locomotive brake equipment. Only the automatic brake valve device 1, feed valve device 2, equalizing reservoir 3, main reservoir 4 and brake pipe 5 of the usual locomotive brake equipment are shown in the drawing, since it is thought that the invention will be more clearly understood that if the other parts of the equipment were shown.

In addition to the usual locomotive brake equipment, a valve device 6 is provided which is adapted to be controlled by an operator for effecting successive predetermined reductions in brake pipe pressure.

On each car of the train is provided the usual brake controlling valve device such as the triple valve device 7 which is operated in the usual manner upon a reduction in pressure in the brake pipe 5 to supply fluid under pressure from an auxiliary reservoir 8 to the usual brake cylinder 9 to effect an application of the brakes and which is operated upon an increase in brake pipe pressure to vent fluid under pressure from the brake cylinder to effect a release of the brakes. On each car there is also provided a quick service brake pipe venting valve device 10 which is adapted to be operated upon a reduction in brake pipe pressure for effecting a local venting of fluid from the brake pipe.

The brake valve device 1 comprises a casing having a valve chamber 11 containing a rotary valve 12 adapted to be operated by a handle 13. In the brake valve casing is mounted the usual equalizing discharge valve mechanism, comprising a piston 14 having a chamber 15 at one side connected, through a passage and pipe 16, with the equalizing reservoir 3, there being a choke plug 17 interposed in this passage having a restricted port for governing the rate of flow of fluid through the passage. At the other side of the piston 14 there is a chamber 18 which is connected, through a passage and pipe 19, with the brake pipe 5.

The piston 14 is adapted to operate a discharge valve 20 for venting fluid from the brake pipe through a discharge fitting 21 having screw-threaded connection with the brake valve casing. The main reservoir 4 is connected through a pipe and passage 22 to the rotary valve chamber 11 and the feed valve device 2 is adapted to supply fluid under pressure from the main reservoir 4, at a reduced pressure, to pipe and passage 23 leading to the seat of the rotary valve 11.

The valve device 6 comprises a casing having a chamber 24 which is connected to a passage 25, and a pipe 26 connects said passage to a passage 27 in the brake valve casing and leading to the seat of the rotary valve 12. Opening into the pipe 26 is a reduction limiting reservoir 28.

The casing of the valve device 6 also has a valve chamber 29 which contains double beat valves 30 and 31 and which is connected, through a passage 32, to a valve chamber 33 containing a control valve 34. The valve 30 controls communication from chamber 24 to the passage 32 and valve chamber 33 and is urged from its seat by a spring 35. The valve 34 controls communication from the valve chamber 33 to a passage 36 leading to the atmosphere and is urged toward its seat by a spring 37, said valve having a fluted stem 38 extending through the passage 36 and exteriorly of the casing is provided with a push button 39 through the medium of which an operator is adapted to control the operation of the valve 34.

In the valve casing is mounted a piston 40 having a seat rib 41 projecting from its lower face adapted to engage a gasket 42, the lower face of the piston being subject to the pressure of fluid in a timing reservoir 43 which in the present embodiment of the invention is formed in the valve casing.

Contained in a chamber 44 at the other side of the piston 40 is a spring 45 which urges the piston in a direction to cause the seat rib 41 to engage the seating gasket 42. The piston 40 is adapted to operate the valves 30 and 31 and for this purpose is provided with a yielding stem 46 adapted to operatively engage the stem 47 of the valve 31.

The timing reservoir 43 is connected through a passage 48 to the chamber at the lower face of piston 40 and is open to the atmosphere through a restricted port in a choke plug 49 and a sounding device such as the whistle 50.

The discharge passage 51 in the discharge fitting 21 is connected to the timing reservoir 43 through a pipe 52, a passage 53, and past a ball check valve 54 and is also open to the atmosphere through a restricted port in a choke plug 55 having screw-threaded connection with the discharge fitting.

The quick service venting valve device 10 may be of any desired construction, but as shown in section in Fig. 2 of the drawing may be identical with the corresponding device shown and described in prior applications, Serial Nos. 563,278 and 620,126, filed September 17, 1931, and June 30, 1932, respectively.

As shown in Fig. 2, this valve device 10 may comprise a casing in which are mounted flexible diaphragms 56 and 57 which are connected, to move in unison, by a hollow stem 58.

The chamber 59 at one side of the diaphragm 56, which diaphragm is of greater area than the diaphragm 57, is connected to a passage 60 which leads to a pipe 61 communicating with the brake pipe 5. The chamber 62 intermediate the diaphragms 56 and 57 is also connected to passage 60 through a restricted port 63 in a choke plug 64, and passage 60 is further connected to chamber 62 by way of a ball check valve 65 and a passage 66. The chamber 67 at the outer face of the diaphragm 57 is also connected to passage 60.

The diaphragm 57 is adapted to engage a valve seat provided on a seat member 68, and controls communication from chamber 67 to a bulb or quick service reservoir 69. Carried by the diaphragm 57 is a guide member 70 which is guided on the seat member 68. The reservoir 69 is provided with a choke plug 71 having a restricted port 72, so that fluid can vent from the reservoir 69 at all times at a rate as determined by the flow area of the port 72.

In operation, when the brake valve device 1 is in running position, as shown in Fig. 1, the brake pipe 5 is maintained charged with fluid at feed valve pressure by flow through pipe and passage 23, a cavity 73 in the rotary valve 12 of the brake valve device and passage and pipe 19. The chamber 15 at one side of the equalizing discharge valve piston 14 is also charged with fluid under pressure by way of cavity 73 and a passage 74, the equalizing reservoir 3 being charged with fluid from the chamber 15 through passage and pipe 16. From the brake pipe passage 19 fluid flows to the chamber 18 at the under side of the equalizing discharge valve piston. The opposing fluid pressures on the opposite sides of the piston 14 being equalized, the piston 14 holds the discharge valve 20 seated.

Further, with the brake valve device 1 in running position, the reduction limiting reservoir 28 is open to the atmosphere through pipe 26, passage 27, a cavity 75 in the rotary valve 12 of the brake valve device and a passage 76.

On cars of the train, the triple valve device 7 is charged with fluid under pressure from the brake pipe 5 in the usual manner, and the quick service vent valve device 10 is charged in the same manner as the corresponding device in the before mentioned pending application, Serial No. 563,278 is charged.

In order to effect a service application of the brakes, the brake valve handle 13 is moved to service position in which the rotary valve 12 connects passage 74 and therefore the equalizing discharge valve piston chamber 15, through a cavity 77, with passage 27 leading to the reduction limiting reservoir 28. Fluid under pressure is then vented from the chamber 15 and the equalizing reservoir 3 to the reduction limiting reservoir 28, and through pipe 26 and passage 25 to the chamber 24 in the valve device 6 and also past the unseated valve 30 and through passage 32 to the valve chamber 33.

The flow area of the port in the choke plug 17 is such that, upon the connecting of the passage 74 to the passage 27, a rapid reduction in the pressure of fluid in chamber 15 is effected, which permits the higher brake pipe pressure in chamber 18 to lift the piston 14 so as to unseat the discharge valve 20. With the discharge valve 20 thus unseated, fluid under pressure is vented from the chamber 18 and brake pipe 5 through the passage 51 in exhaust fitting 21 to the pipe 52 and to the atmosphere by way of the restricted port in the choke plug 55.

Fluid vented into pipe 52 flows through passage 53 and past the ball check valve 54 to chamber 43 and the pressure builds up until the pressure therein acting on the under face of the piston 40 is sufficient to overcome the pressure of the spring 45. The piston 40 is then moved outwardly, causing the stem 46 to engage the stem 47 and move the valve 31 from its seat and also move the valve 30 to its seat.

The pressure in the reduction limiting reservoir 28 quickly equalizes with the pressure in the equalizing reservoir 3. Now when the brake pipe pressure has been reduced by flow past the discharge valve 20 through the pipe 52 and restricted port in the choke plug 55 to a degree slightly less than the pressure at which the equalizing reservoir 3 equalizes into the reduction limiting reservoir 28, the piston 14 will move downwardly, due to the force of gravity, and seat the valve 20, thus cutting off the further venting of fluid from the brake pipe.

When the discharge valve 20 is seated, the pressure in the timing chamber 43 is reduced at a rate as permitted by the restricted port in the choke plug 49, until the pressure of spring 45 overcomes the reduced pressure of fluid acting below the piston 40.

The piston 40 is then moved to cause the seat rib 41 to engage the gasket 42, and thereby the valve 30 is permitted to unseat by the action of the spring 35.

Fluid under pressure vented from the chamber 43, by way of the restricted port in the choke plug 49, flows through the whistle 50, causing it to sound. The whistle will sound until the pressure of fluid in chamber 43 is reduced sufficiently that the spring 45 will have moved the piston 40 to its normal position, in which position it is shown in Fig. 1, when it will be silent.

The check valve 54 prevents back flow of fluid from the timing chamber 43 to the pipe 52, which pipe is open to the atmosphere through passage 51 in the exhaust fitting 21 and through the restricted port in the choke plug 55.

When the whistle 50 becomes silent the operator pushes the button 39 inwardly, causing the valve 34 to be unseated. With the valve 34 unseated, fluid under pressure is vented from the reduction limiting reservoir 28 and chamber 15 to the atmosphere by way of pipe 26, passage 25, chamber 24 in the valve device 6, past the unseated valve 30, passage 32, valve chamber 33, past the unseated valve 34 and passage 36. Upon thus reducing the pressure of fluid in the chamber 15, the piston 14 will be operated to unseat the discharge valve 20, so that fluid under pressure is again vented from the brake pipe to the timing chamber 43.

Fluid under pressure thus supplied to the chamber 43 causes the piston 40 to move outwardly and seat the valve 30 in the same manner as before described in connection with the initiating of the application of the brakes, thus closing off the flow of fluid from the reduction limiting reservoir to the atmosphere. When the discharge of fluid from the passage 36 ceases, the operator relieves his pressure on the button 39 and the spring 37 then acts to seat the valve 34.

With the valve 30 seated, the pressure of fluid in the reduction limiting reservoir 28 quickly equalizes with the pressure of fluid in the equalizing reservoir 3. Now when the brake pipe pressure has been reduced to a degree slightly less than the pressure at which the equalizing reservoir 3 equalizes into the reduction limiting reservoir 28, the piston 14 will again move downwardly and seat the valve 20, thus cutting off the further venting of fluid from the brake pipe.

When the whistle 50 becomes silent, the operator will know that he is able to effect another predetermined light reduction in brake pipe pressure by pushing the button inwardly.

It will here be understood that through the operation of the valve 34 by means of the push button 39, the operator may effect as many predetermined light reductions in brake pipe pressure as he deems necessary to produce the desired brake application and may also regulate the period of time elapsing between the reductions in brake pipe pressure.

If the operator desires to have the valve device 6 operate to automatically effect a series of predetermined reductions in brake pipe pressure at regular intervals, he does not permit the valve 34 to be seated when the flow of fluid through the passage 36 ceases, i. e., when the valve 30 is seated. When, with the valve 34 unseated, the valve 30 is moved to its unseated position, fluid under pressure is vented from the reduction limiting reservoir to the atmosphere, causing the piston 14 to operate to again vent fluid under pressure from the brake pipe to the timing reservoir 43. When the pressure of fluid in the timing chamber is increased sufficiently to overcome the pressure of the spring 45, the piston 40 is caused to operate to seat the valve 30 and close off the further venting of fluid from the reduction limiting reservoir 28.

As long as the operator maintains the brake valve device 1 in service position and the valve 34 unseated, the valve device 6 will continue to function in the manner just described, so as to automatically effect a series of successive predetermined light reductions in brake pipe pressure.

The brake pipe venting valve device 10 on cars of the train responds, in the same manner as described in the before mentioned prior application, Serial No. 563,278, to each reduction in brake pipe pressure effected by the operation of the locomotive apparatus, for effecting a corresponding local reduction in brake pipe pressure on each car.

To release the brakes the rotary valve 12 of the brake valve device is first turned to release position and then after a predetermined period of time has elapsed is turned to running position, in which positions the locomotive and car equipments are recharged in the usual well known manner. In both release and running positions, fluid under pressure may be completely discharged from the reduction limiting reservoir 28 by way of pipe 26, passage 27, cavity 75 in the rotary valve 12 and passage 76.

By providing the before described additional locomotive apparatus, an operator may regulate the interval of time elapsing between successive reductions in brake pipe pressure or may cause the successive reductions to be automatically effected at regular intervals.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe, of valve means operative for automatically effecting either a single predetermined reduction in brake pipe pressure or a series of successive predetermined reductions in brake pipe pressure, and means operative for selectively controlling the operation of said valve means.

2. In a fluid pressure brake equipment, the combination with a brake pipe, of valve means operative for automatically effecting either a single predetermined reduction in brake pipe pressure or a series of successive predetermined reductions in brake pipe pressure, and a valve operative manually for selectively controlling the operation of said valve means.

3. In a fluid pressure brake equipment, the combination with a brake pipe, of valve means for effecting successive predetermined reductions in brake pipe pressure, and means operative for selectively controlling the operation of said valve means to either automatically effect a series of successive reductions in brake pipe pressure at regular intervals or to effect each of the successive reductions in brake pipe pressure at will.

4. In a fluid pressure brake equipment, the combination with a brake pipe, of valve means for effecting successive predetermined reductions in brake pipe pressure, and means controlled manually for selectively controlling the operation of said valve means to either automatically effect successive reductions in brake pipe pressure at regular intervals or to initiate each of the successive reductions at will.

5. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, and means operated by fluid vented from the brake pipe for closing said communication.

6. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, a normally unseated valve past which fluid under pressure vented from the reduction reservoir flows when the first mentioned valve is open, and means operated by fluid vented from the brake pipe for seating the second mentioned valve to close off the flow of fluid from the reduction reservoir through said communication.

7. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, and means for automatically effecting successive reductions in pressure in the reduction reservoir when said manually operable valve is maintained open for longer than a predetermined period of time.

8. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, and means for effecting a single reduction in pressure in the reduction reservoir when said manually operable valve is closed within a predetermined period of time and for automatically effecting successive reductions in pressure in the reduction reservoir when said manually operable valve is maintained open for longer than said predetermined period of time.

9. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, and means for effecting a single reduction in pressure in the reduction reservoir when said manually operable valve is closed within a predetermined period of time and for automatically effecting successive predetermined reductions in pressure in the reduction reservoir at regular intervals when said manually operable valve is maintained open for longer than said manually operable predetermined period of time.

10. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, means for effecting a single reduction in pressure in the reduction reservoir when said manually operable valve is closed within a predetermined period of time and for automatically effecting successive reductions in pressure in the reduction reservoir when said manually operable valve is maintained open for longer than said predetermined period of time, and means for indicating when said manually operable valve is to be closed to prevent successive reductions in pressure in the reduction reservoir from being automatically effected.

11. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, means operated by fluid vented from the brake pipe for closing said communication for a predetermined period of time, and means for indicating when said predetermined period of time has elapsed.

12. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, means operated by fluid vented from the brake pipe for closing said communication for a predetermined period of time, and means subject to the pressure of fluid vented from the brake pipe for indicating the duration of said period of time.

13. In a fluid pressure brake, the combination with a brake pipe, an equalizing reservoir and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir to effect a reduction in pressure in the reduction reservoir, a valve normally closing said communication and operable manually for opening said communication to vent fluid under pressure from the reduction reservoir, means operated by fluid vented from the brake pipe for closing said communication and operable upon a predetermined reduction in the pressure of fluid vented from the brake pipe for opening said communication, and means for slowly reducing the pressure of fluid vented from the brake pipe.

14. In a fluid pressure brake, the combination with a brake pipe, an equalizing reservoir and a valve device operated upon a reduction in pressure in said reservoir for venting fluid from the brake pipe and operated upon the substantial equalization of the pressures in the brake pipe and equalizing reservoir for closing off the venting of fluid from the brake pipe, of a reduction reservoir, means for connecting the equalizing reservoir to the reduction reservoir to effect a reduction in pressure in the equalizing reservoir, a communication through which fluid under pressure is adapted to be vented from the reduction reservoir, a normally seated valve closing said communication operable manually to open said communication for venting fluid under pressure from the reduction reservoir, valve means operated by fluid, vented from the brake pipe for closing said communication and operated upon a predetermined reduction in the pressure of fluid vented thereto from the brake pipe for opening said communication, means for preventing back flow of fluid from said valve means when said valve device closes off the flow of fluid from the brake pipe, and means for slowly reducing the pressure of fluid supplied from the brake pipe to said valve means.

15. In a fluid pressure brake, the combination with a brake pipe, an equalizing reservoir and valve mechanism operated upon a reduction in pressure in said equalizing reservoir for venting fluid under pressure from the brake pipe, a brake valve device operable to establish a communication through which fluid under pressure is adapted to be vented from the equalizing reservoir, of a valve separate from the brake valve device and operated manually for effecting a reduction in the equalizing reservoir pressure, and means operated by fluid under pressure vented from the brake pipe for limiting the amount of reduction in pressure in the equalizing reservoir.

16. In a fluid pressure brake, the combination with a brake pipe, an equalizing reservoir and a valve device operated upon a reduction in pressure in said reservoir for venting fluid from the brake pipe, of a reduction reservoir, means operable to connect the equalizing reservoir to the reduction reservoir to effect an initial reduction in pressure in the equalizing reservoir, a valve operated manually for effecting a subsequent reduction in pressure in said reduction reservoir and consequently in said equalizing reservoir, and means operated by fluid under pressure vented from the brake pipe for limiting the reduction in pressure in the reduction reservoir.

EARLE S. COOK.